Patented Sept. 4, 1928.

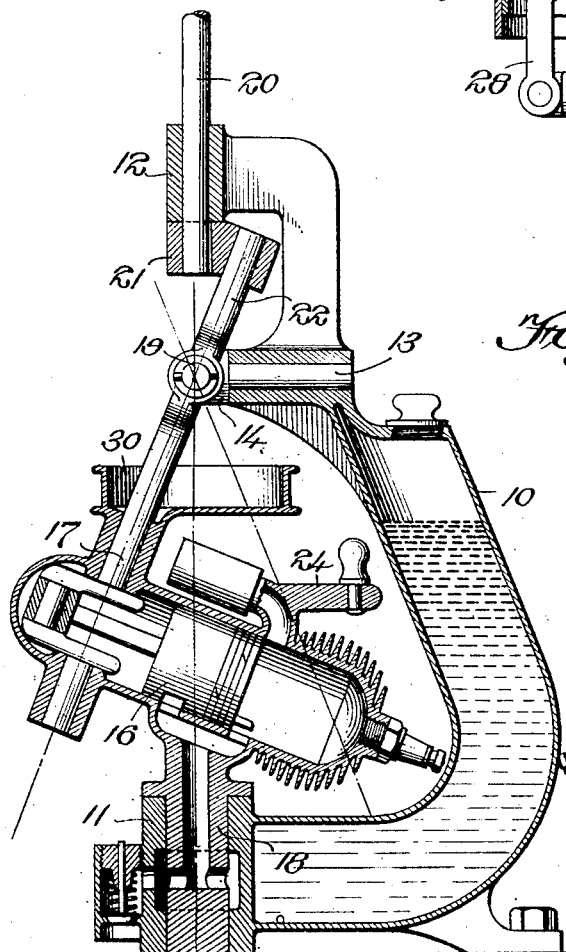

1,683,229

UNITED STATES PATENT OFFICE.

DORSEY F. ASBURY, OF WASHINGTON, DISTRICT OF COLUMBIA.

EXPLOSIVE ENGINE OF THE ROTATING-CYLINDER TYPE.

Application filed May 13, 1921. Serial No 469,141.

My invention relates to explosive engines of the rotating cylinder type, and more particularly it relates to an engine of this type in which the cylinder and crank shaft are both disposed at an angle to the plane defined by any point of the cylinder during rotation thereof, whereby independent shafts or members may be driven from the cylinder and crank shaft, respectively, and whereby movement of the crank shaft may be converted into various different motions without the use of gearing or similar devices. Furthermore, it is a purpose of my invention to produce an engine of the rotating cylinder type in which the crank shaft is disposed at an angle to the axis of rotation of the cylinder and itself does not rotate but swings in a conical path, and in addition to its swinging movement has only pivotal movement with respect to the engine frame, whereby a shaft or member may be driven clockwise, counter-clockwise or reciprocally. By arranging the cylinder at an angle other than a right angle to its axis of rotation I am enabled to provide an air cooled engine the explosion chamber end of which moves in an air space unobstructed by any other part of the engine, whereby full cooling advantage of the atmosphere is obtained. In addition to the foregoing my invention permits of an engine design in which the axis of rotation of the cylinder is disposed intermediate the limits of movement of the piston, whereby the centrifugal force produced by the piston is to a considerable extent eliminated, and whereby such centrifugal force as may be set up in the piston is to a major extent balanced by the centrifugal force produced by the crank shaft.

My inventive idea is capable of embodiment in a variety of mechanical structures, certain of which are illustrated in the accompanying drawings, but it is to be understood that the structures shown are merely intended to disclose the essential features of my invention in a preferred form and that its scope is as defined in the appended claims.

In the drawings, wherein like characters of reference denote corresponding parts in the different views—

Fig. 1 is a vertical section through an internal combustion engine constructed in accordance with my invention, showing the relative position of its parts upon completion of the firing stroke of the piston.

Fig. 2, a vertical sectional view at right angles to Fig. 1 with the cylinder shown rotated ninety degrees from the position shown in Fig. 1 and a modified arrangement shown whereby motion of the crank shaft may be converted into reciprocating motion to a shaft driven thereby.

Fig. 3, a fragmentary view showing a different arrangement whereby reciprocating motion may be imparted to a member driven from the crank shaft; and Figs. 4 and 5, views taken relatively at right angles and showing an arrangement whereby motion may be imparted from the crank shaft to a member moving in a direction opposite to the direction of movement of said crank shaft.

Referring to the drawings in detail, my improved engine is shown as including a frame 10 which may be of any desired construction and design and includes a portion 11 having a bore therein in axial alinement with a second bore formed in an extension 12 of the frame suitably spaced from said portion 11. At preferably right angles to the axes of the bores just mentioned the frame is provided with a further bore which rotatably receives the shank 13 of a member including a head 14, the axis of which extends at right angles to the axis of said shank and intersects the axes of said first bores.

My improved engine further includes a cylinder 15, piston 16 and a crank shaft 17. The cylinder 15 is arranged adjacent the portion 11 of the frame with its axis disposed at an angle other than a right angle to the axis of the bore in said portion 11, an extension 18 of said cylinder being rotatably received in the bore of the portion 11 of the frame whereby the cylinder is mounted for rotation. The axis of the crank shaft 17 is disposed at right angles to the axis of the cylinder and intersects the axis of rotation of the cylinder in the axis of the shank 13 and head 14 respectively, being provided with a yoke whereby it is pivotally connected with a pin 19 carried axially of the head 14. With respect to the frame the crank shaft is thus mounted for universal pivoted movement and when the cylinder is rotated the axis of said crank shaft will travel in a conical path as is obvious.

Rotatably mounted in the bore of the extension 12 of the frame is a shaft 20 which has fixed to its inner end a member 21 having a bore therein disposed at an angle to the axis of said shaft, and rotatably received in this bore is an extension 22 of the crank shaft, whereby swinging or conical movement of the crank shaft will result in rotation of the shaft 20 in a manner which is apparent, the crank shaft during its conical movement, pivoting on the shank 13 and pin 19.

In Fig. 4 of the drawings is illustrated an arrangement whereby conical movement of the crank shaft in one direction may be caused to transmit rotary motion to a shaft in a reverse direction. The arrangement shown consists of a second yoke member 23 pivoted on the same pin which also serves as a pivot for the yoke of the crank shaft, said second yoke member being provided with a shaft extension disposed at an obtuse angle to the crank shaft and connected by a member 21' with the shaft desired to be rotated. The action in this case is the reverse of that resulting from the structure shown in Fig. 1 so that if the crank shaft swings clock-wise the shaft driven therefrom will rotate counter-clockwise.

By arranging the cylinder at an angle other than a right angle to its axis of rotation it is apparent that the explosion chamber end thereof will rotate in an unobstructed air space of its own whereby the full cooling effect and circulation of air around this end of the cylinder is obtained.

In order to overcome to a considerable extent the centrifugal force set up in the cylinder during rotation thereof, which force would tend to straighten out the cylinder and cause it to assume a position at right angles to its axis of rotation, I have constructed the crank shaft bearing in such manner and have arranged the muffler and a mass of metal 24 in such manner that substantially equal masses of the rotating parts of the engine will be found upon opposite sides of its axis of rotation, whereby the engine is balanced, and its smooth operation assured. Furthermore, it is to be observed that the axis of rotation of the cylinder is disposed intermediate the limits of movement of the piston, which also assists in balancing the engine.

Conical motion of the crank shaft may be converted into reciprocal motion to a shaft or member by either of the mechanisms shown in Figures 2 and 3. In the former instance the structure is the same as shown in Fig. 1 except that an arm 25 is extended from the head 14' and connected at its end with a sliding block 26 mounted in a suitable guideway 27. Pivotal movement of the head 14' during conical movement of the crank shaft will oscillate the arm 25 and reciprocate the block as is obvious. In the latter instance a link 28 is connected at one end to the pin 19' and at its opposite end to a member 29 desired to be reciprocated, and when the head 14'' is oscillated reciprocatory motion will be imparted to the member 29 through the link 28.

A pulley 30 may be fixed to the cylinder so that a belt may be driven from the engine for operating any desired mechanism.

The engine illustrated is of the two cycle type and the piston operates by reaction through the non-rotatable crank shaft to produce rotary motion of the cylinder. Further detailed description of my invention is therefore deemed unnecessary.

I claim:—

1. In an engine structure, a frame, a rotatable cylinder, a shaft rotatably mounted on the frame and having its axis of rotation coincident with the axis of rotation of the cylinder, a crank shaft inclined to the axis of rotation of the cylinder and connected with the rotatable shaft on the frame, and a universal joint connection between the chank shaft and said frame.

2. An engine including a rotatable cylinder, a reciprocating piston and a crank shaft which is mounted to move in a conical path during operation of the engine, and means acting to prevent rotation of said crank shaft whereby the piston reacts through the same to produce rotary motion of the cylinder.

3. An engine including a frame, a rotatable cylinder, a crank shaft, a member rotatably mounted in said frame, the axis of rotation of said member being at an angle to and intersecting the axis of rotation of said cylinder, and a pivotal connection between the crank shaft and said member.

4. An engine including a frame, a rotatable cylinder, a crank shaft, a member rotatably mounted in said frame, the axis of rotation of said member intersecting the axis of rotation of said cylinder, and a rotatable connection between the crank shaft and said member on an axis intersecting both the axis of rotation of said member and the axis of rotation of the cylinder.

5. An engine of the reciprocating piston type including a cylinder and a movable crank shaft, the axis of said crank shaft being disposed at right angles to the axis of the bore of said cylinder, and means mounting said cylinder for rotation about an axis disposed at an angle to the axis of said crank shaft such that the axis of said crank shaft is caused to travel in a conical path during rotation of the cylinder.

6. An engine of the reciprocating piston type including a cylinder, a piston reciprocable therein, and means mounting said cylinder for the rotation about an axis disposed at an angle to the axis of its bore such that the axis of its bore is caused to travel in a conical path during rotation of the cylinder, the axis on which said cylinder rotates intersecting the axis of the bore of said cylinder at a point intermediate the limits of movement of said piston within said cylinder.

7. An engine of the reciprocating piston type including a cylinder and a movable crank shaft, the axis of said crank shaft being disposed at right angles to the axis of the bore of said cylinder, and means mounting said cylinder for rotation about an axis disposed at an angle to the axis of its bore such that the axis of its bore and the axis of said crank shaft are caused to travel in conical paths during rotation of the cylinder, the axis of said crank shaft intersecting the axis of rotation of said cylinder.

8. An engine of the reciprocating piston type including a cylinder, means to cause said cylinder to rotate about a fixed axis during operation of the engine, the axis of the bore of said cylinder being disposed at an angle between 0 and 90° to its axis of rotation and the axis of rotation of said cylinder intersecting the axis of its bore between the ends of the cylinder, whereby different points along the length of the cylinder travel in different planes during its rotation and whereby the centrifugal force set up in one end of the cylinder during its rotation is substantially balanced by the centrifugal force set up in the other end thereof.

9. An engine of the reciprocating piston type including a frame, a cylinder having a fixed axis of rotation disposed at an angle between 0 and 90° to the axis of the bore thereof, a crank shaft, and a connection between said crank shaft and said frame holding said crank shaft against rotation and permitting same to swing, whereby the cylinder is caused to rotate about its fixed axis of rotation and to produce movement of said crank shaft in a conical path during operation of the engine.

10. An engine of the reciprocating piston type including a cylinder, a crank shaft having its axis disposed at right angles to the axis of said cylinder, a fixed support, and a connection between said crank shaft and said fixed support holding the crank shaft against rotation whereby the cylinder is caused to rotate on a fixed axis during operation of the engine, the axis of said cylinder being disposed at an angle between 0 and 90° to its axis of rotation.

In testimony whereof I hereunto affix my signature.

DORSEY F. ASBURY.